(12) United States Patent
Frydendal et al.

(10) Patent No.: US 11,719,277 B2
(45) Date of Patent: Aug. 8, 2023

(54) BEARING FOR A WIND TURBINE, WIND TURBINE COMPRISING A BEARING AND METHOD FOR PRODUCING A BEARING RING

(71) Applicant: Siemens Gamesa Renewable Energy A/S, Brande (DK)

(72) Inventors: Niels Karl Frydendal, Herning (DK); Kim Thomsen, Skørping (DK); Morten Thorhauge, Ry (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/584,857

(22) Filed: Jan. 26, 2022

(65) Prior Publication Data

US 2022/0260114 A1 Aug. 18, 2022

(30) Foreign Application Priority Data

Feb. 12, 2021 (EP) .................................... 21156866

(51) Int. Cl.
*F16C 17/06* (2006.01)
*F16C 17/10* (2006.01)
*F16C 32/06* (2006.01)
*F16C 17/03* (2006.01)
*F03D 80/70* (2016.01)

(52) U.S. Cl.
CPC .............. *F16C 17/06* (2013.01); *F03D 80/70* (2016.05); *F16C 17/03* (2013.01); *F16C 17/035* (2013.01); *F16C 32/067* (2013.01); *F16C 2229/00* (2013.01); *F16C 2360/31* (2013.01)

(58) Field of Classification Search
CPC ........ F16C 17/03; F16C 17/035; F16C 17/06; F16C 17/065; F16C 17/107; F16C 32/067; F16C 2229/00; F16C 2360/31; F03D 80/70
See application file for complete search history.

(56) References Cited

U.S. PATENT DOCUMENTS 8,282,353 B2 10/2012 Russ et al.
11,041,529 B2 * 6/2021 Frydendal ............... F16C 17/03
2013/0287574 A1 10/2013 Ebbesen et al.
(Continued)

FOREIGN PATENT DOCUMENTS

CN 103375356 B 10/2017
DE 102008049812 A1 4/2010
(Continued)

OTHER PUBLICATIONS

European Search Report dated Aug. 12, 2021 for application No. 21156866.2.

*Primary Examiner* — Phillip A Johnson
(74) *Attorney, Agent, or Firm* — Schmeiser, Olsen & Watts LLP

(57) ABSTRACT

Provided is a bearing for a wind turbine, including a first and a second ring arranged radially to each other with one ring rotating relative to the other ring around an axis of rotation. The first ring has a cylindrical ring section and a collar extending radially from the ring section. The collar has an axial support area supporting axial bearing elements, wherein several pretension elements creating compressive stress are fixed to the first ring in the section where the collar extends from the ring section.

15 Claims, 6 Drawing Sheets

(56) References Cited

U.S. PATENT DOCUMENTS

| | | | |
|---|---|---|---|
| 2014/0193264 A1 | 7/2014 | Pedersen et al. | |
| 2014/0321781 A1* | 10/2014 | Pedersen | F16C 17/10 |
| | | | 384/321 |
| 2015/0369284 A1* | 12/2015 | Hager | F16C 17/26 |
| | | | 384/291 |
| 2019/0085831 A1* | 3/2019 | Frydendal | F16C 25/04 |
| 2019/0085832 A1* | 3/2019 | Brencher | F03D 80/70 |
| 2020/0362832 A1* | 11/2020 | Bak | F16C 17/107 |
| 2021/0348599 A1* | 11/2021 | Rohrmann | F16C 43/02 |
| 2022/0260114 A1 | 8/2022 | Frydendal | |

FOREIGN PATENT DOCUMENTS

| | | | |
|---|---|---|---|
| DE | 202011102602 U1 * | 12/2011 | F03D 7/0204 |
| EP | 2568167 A1 | 3/2013 | |
| EP | 3904709 A1 | 11/2021 | |
| EP | 3904711 A1 * | 11/2021 | F03D 80/50 |
| EP | 4043743 A1 | 8/2022 | |
| GB | 2504618 A | 2/2014 | |
| JP | S62287965 A | 12/1987 | |
| JP | 2014030877 A | 2/2014 | |

* cited by examiner 31  34 32  9  27

BEARING FOR A WIND TURBINE, WIND TURBINE COMPRISING A BEARING AND METHOD FOR PRODUCING A BEARING RING

CROSS-REFERENCE TO RELATED APPLICATIONS

This application claims priority to European Application No. 21156866.2, having a filing date of Feb. 12, 2021, the entire contents of which are hereby incorporated by reference.

FIELD OF TECHNOLOGY

The following refers to a bearing for a wind turbine, comprising a first and a second ring arranged radially to each other with one ring rotating relative to the other around an axis of rotation, whereby the first ring has a cylindrical ring section and a collar extending radially from the ring section, whereby the collar has an axial support area supporting axial bearing elements.

BACKGROUND

A wind turbine, as commonly known, comprises a tower and a nacelle fixed to the top of the tower. A hub, to which several rotor blades are attached, is arranged at the nacelle. The hub rotates, when the turbine blades interact with blowing wind and drives a generator for producing electric power, as commonly known. Such a wind turbine comprises several rotating elements, which are arranged in respective bearings. One example is the main bearing of the generator at a direct drive wind turbine, while the turbine may also comprise one or more gears, for example of a planetary gear or a hydraulic gear system.

The bearing usually comprises two rings, i.e., a first ring and a second ring which are usually arranged radially to each other. One ring is stationary, while the other ring rotates relative to the first ring. It is possible that the radially inner ring is stationary and coupled to a stationary main shaft of the wind turbine while the outer ring rotates around the inner ring and is coupled to a rotor of a generator. Vice versa it is also possible that the outer ring is stationary while the inner ring rotates. The respective rotating ring, no matter how the bearing is set up, is coupled to the hub and the respective component which needs to be rotated so that a rotation of the hub is transferred to the component.

While it is known that the bearing is a roller bearing comprising several rollers which may be tapered rollers, it is also known to concept the bearing as a sliding bearing or plane bearing. The stationary ring is usually provided with respective bearing elements in form of sliding pads, on which the rotating ring slides and is supported by a very thin fluid film. The bearing pads, which may be tiltable and which are therefore able to compensate any geometric tolerances between the rings arising among others from the forces which act on the bearing, are arranged at the stationary ring which has a specific ring design respectively geometry. This ring, which may also be named as a housing or a bearing housing, comprises a cylindrical ring section, on which the other ring is radially supported by respective radial bearing elements. For the axial support, the ring is provided with axial bearing elements, which are supported at a specific axial support area realized at this ring. To realize this support area, the ring comprises a collar, which extends radially from the cylindrical ring section. The axial ring surface of this collar is the axial support area, at which the sliding bearing elements are supported.

In operation, when blowing wind interacts with the rotor blades, high loads rest on the bearing, which loads are introduced via the rotor blades into the rotating ring of the bearing which is, as mentioned, axially supported by the axial bearing elements arranged at the stationary ring. These loads may also vary during the operation. Nevertheless, due to the geometry of this stationary ring comprising the cylindrical ring section and the radially extending collar, it was found that in the region where the collar meets the cylindrical ring section, a high stress concentration occurs creating high tensile stress in the bearing ring in this area where the collar and the ring section show almost a rectangular design. To cope with this problem, respectively to counteract these high tensile stress or loads, it would be possible to use material having a higher strength or rigidity. This would cause higher costs, as specific material needs to be used being less ductile and showing other mechanical properties. In an alternative, material could be added respectively a ring with a thicker ring section and collar may be used. This would lead to a heavier bearing respectively structure which again incurs higher costs and is also not acceptable.

SUMMARY

An aspect relates to an improved bearing.

For addressing this aspect, a bearing as mentioned above is characterized in that several pretension elements creating compressive stress are fixed to the first ring in the section where the collar extends from the ring section.

According to embodiments of the invention, the first ring which comprises the cylindrical ring section and the collar is provided with several pretension elements which are used for creating internal compressive stress in the first ring respectively in the section where the high tensile stress occurs resulting from the axial support of the axial bearing elements respectively the sliding pads. This introduced high compressive stress somehow counteracts the induced tensile stress respectively allow to induce a higher tensile stress until the tolerable tensile stress limit is reached. So, with these pretension elements it is possible to "strengthen" the first ring especially in the section where the high tensile stress is induced, i.e., in the section where the collar extends from the ring section respectively merges with this ring section.

To create the compressive stress in this area, the pretension elements are arranged at the first ring in this peculiar section or area where the collar extends from the ring section so that the counteracting compressive stress is generated exactly where it is needed, i.e., at the place where the tensile stress resulting from the operation of the turbine is induced in the first ring.

The arrangement of the pretension elements is a cheap but very effective way for enhancing the mechanical properties of the first ring making the ring more tolerable against high tensile stress resulting from respective loads. The first ring respectively the bearing housing material has typically a higher load capacity in view of fatigue and ultimate strength in view of compression loads than in view of tensile loads. Therefore, by the pretension elements the strength of the first ring may significantly be improved.

In an embodiment, each pretension element is a at least partially threaded bolt inserted in a at least partially threaded bore extending into the ring section, which bolt is directly or indirectly supported on a support surface against the ring. By these bolts, which are screwed with their respective threaded sections into respective threaded bores, and which are supported on a support surface against the ring, it is possible to create and induce respective compressive stress into the ring material. The bolt is firmly secured with the section threaded into the threaded bore at the one end and with its support against the ring at the other end, so that depending on the tension by which the bolt is tensioned, the respective compressive stress can be generated and adjusted. As will be explained later, various embodiments regarding these bolt elements and their fixation are possible. It may be a bolt-nut-combination with the nut being screwed on the bolt and which nut is supported against the respective support surface which may either be directly provided at the ring or by a washer or the like. On the other hand, bolts having a hex head may be used which is directly supported on the ring support surface or at a respective intermediate washer or the like.

While such a bolt pretension element is desirable, as it is simple in its design and as the bores are simple to be provided in the ring, also other pretension elements may be used, for example clamps like screw-clamp-like arrangements which are fixed to the ring may be used.

The bores in which the bolts are inserted respectively screwed are provided in an axial surface of the first ring and extend into the ring section. According to this embodiment, the bores are provided at the outer axial ring surface of the first ring and run into the cylindrical ring section. The length of the bore depends on the thickness of the collar, seen in the axial direction, as the bore needs to extend quite deep into this ring section, over at least one third of the axial thickness respectively about half of its axial thickness.

The bores and the bolts are arranged around the axis of rotation of the bearing in an equidistant distribution. Around the axial ring surface, a respective number of bolts and bores are provided, for example any number between 10-30 bores respectively bolts, depending on the diameter of the ring. In an embodiment, the number is between 15-25, and between 18-22.

Regarding the orientation of the bores and thus the bolts two alternatives are possible. In a first alternative, each bore and certainly also the respective bolt extends parallel to the axis of rotation of the bearing. In an alternative, each bore, and the respective bolt extend under an angle to the axis of rotation into the ring section. The orientation depends on the orientation of the collar. If the collar extends radially outward from the cylindrical ring section, the bores and bolts are orientated towards the axis of rotation. If the collar extends inward, the longitudinal axis of the bores and bolts run away from the axis of rotation.

If the bores and the bolts are angled, the angle is between 3°-30°, between 5°-20°. The chosen angle certainly depends on the final geometry of the first ring in this area.

For firmly fixing each bolt in the bore, the bolt as mentioned is at least partially threaded at least at one end, which end is inserted in the threaded bore which may either be threaded over its whole length, or only in its inner end region. It is certainly possible that the bolt is also threaded over its whole length.

According to a first embodiment, each bolt may extend with a threaded end out or the bore, whereby a nut is screwed on the thread, which nut is supported on the support surface. In this embodiment, the bolt is a simple threaded stud which stud may be threaded over its whole length or only in the respective end regions, with one end region being screwed into the bore thread. The other end extends out of the bore. A nut is screwed on this end, which nut is firmly screwed against the respective support surface thereby tensioning the bolt respectively stud and with this the first ring. The tension may be appropriately adjusted by the torque applied to the nut.

In a second alternative, each bolt has a bolt head comprising an attachment section for a tool, which bolt head is supported on the support surface. Here, the bolt may be provided for example with a hex head. The bolt is threaded at its opposite end section or over its whole length and screwed into the bore thread until the bolt head is supported on the support surface. Also here, depending on the torque applied to the bolt head, the tension of the bolt and therefore the applied compressive stress may be adjusted appropriately.

As mentioned, it is possible that the bores and the bolts respectively their longitudinal axes are angled towards the axis of rotation. In order to realize an even local load distribution of the nut respectively the bolt head on the support surface, a further embodiment of the invention provides that the nut or the bold head of each bolt arranged angled towards the axis of rotation is supported on a support surface which is orientated perpendicular to the longitudinal bore axis. This embodiment allows for a perfect even or symmetrical load distribution of the load applied by the nut respectively the bolt head to the support surface. Both, the nut and the bolt head have a flat contact surface. To ascertain that this flat contact surface is completely supported on the respective support surface, and as the longitudinal axis of the bolt is angled towards the axis of rotation, this angle is compensated by also arranging the support surface in a respective angled position. According to this inventive embodiment, the support surface is orientated perpendicular to the longitudinal bore axis and is therefore parallel to the respective contact surface of the nut respectively the bolt head. This ascertains that the nut or the bolt head contact surface is completely supported on the respective support surface, so that any load is evenly distributed over this contact area.

The respective support surface may be integral with the first ring. The ring is machined at its axial front surface, where the nut or the bolt head shall be supported, in order to work out the respective ring-shaped areas with the angled support surfaces. As also the bore is provided in exactly this area, the support surface can be provided with an excellent orientation.

In an alternative, it is also possible to provide a respective washer comprising the support surface. Here the axial ring surface is flat. A washer is attached to this ring surface, through which the bolt is inserted into the bore. The washer itself comprises the respective angled support surface. Here, the orientation of the washer around the bore axis needs to be adjusted in order to have a flat overall contact of the contact surface of the nut or the bolt head on the respective washer support surface. Nevertheless, also this embodiment allows for an excellent load distribution.

The bearing elements supported at the first ring respectively fixed there to at the collar, are tiltable fluid film bearing pads, on which the second ring, which has for example a rectangular cross-section, is axially supported. So, the bearing itself is a fluid film bearing respectively a sliding bearing.

Embodiments of the invention further refer to a wind turbine which comprises at least one bearing as previously mentioned. This bearing is the main bearing of the turbine.

The first ring is an inner ring and is coupled to a stationary shaft, while the second ring is an outer ring and is coupled to a rotor of a generator.

Finally, embodiments of the invention also refer to a method for producing a first ring of a bearing as previously mentioned. This method is characterized in that the pretension elements are first fixed to the ring and tensioned for generating the compression stress, whereafter the support area of the collar is machined. This inventive method addresses the fact, that in a fluid film bearing using respective tilting sliding pads it is important to have highly accurate machined surfaces at the respective first ring respectively the bearing housing, on which surfaces the individual sliding pads rest. This means that the support surface of the collar needs to be perfectly machined in order to ensure a most even load distribution between the sliding pads. When the pretension elements, respectively the bolts, are tensioned, the first ring respectively the bearing housing will slightly deform resulting in a slightly uneven support surface provided at the collar. This results in a poor load sharing distribution between the individual adjacent tilting pads. To address this problem, the inventive method proposes to first fix and tension all pretension elements and to generate the requested and well-defined compression stress, which fixation results in the mentioned slight deformation of the support surface. After all pretension elements are tensioned, the respective collar support surface is machined in order to ascertain, that this support surface is completely flat in order to support all sliding pads perfectly.

BRIEF DESCRIPTION

Some of the embodiments will be described in detail, with reference to the following figures, wherein like designations denote like members, wherein.

DETAILED DESCRIPTION

Figure 1:
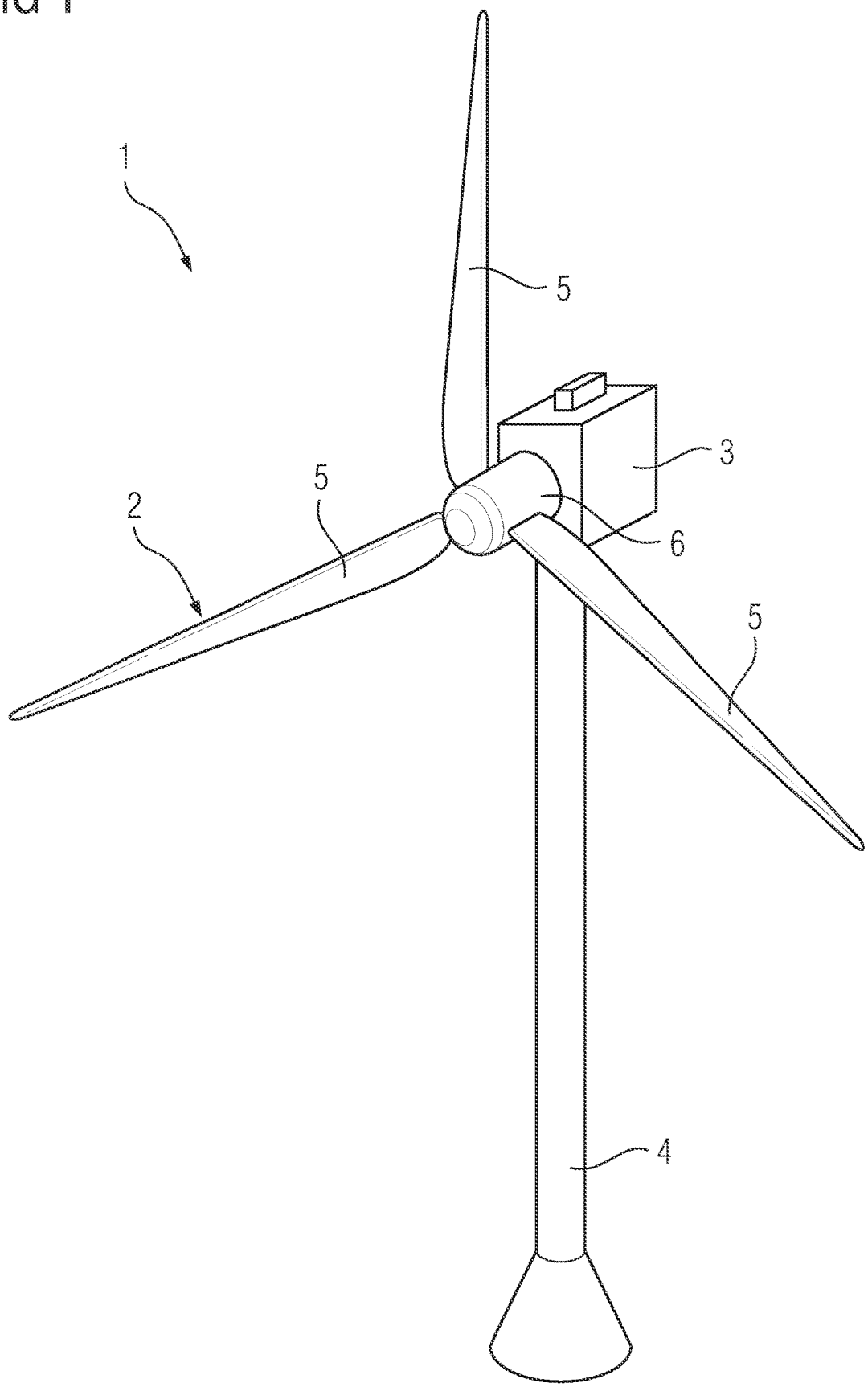
FIG. 1 shows a principle perspective illustration of a wind turbine.

FIG. 1 shows a principle illustration of a wind turbine 1 comprising a rotor 2, a nacelle 3 and a tower 4, on top of which the nacelle 3 is arranged. The rotor 2 comprises three rotor blades 5 which are attached to a hub 6. The principle setup of such a wind turbine is known.

Figure 2:
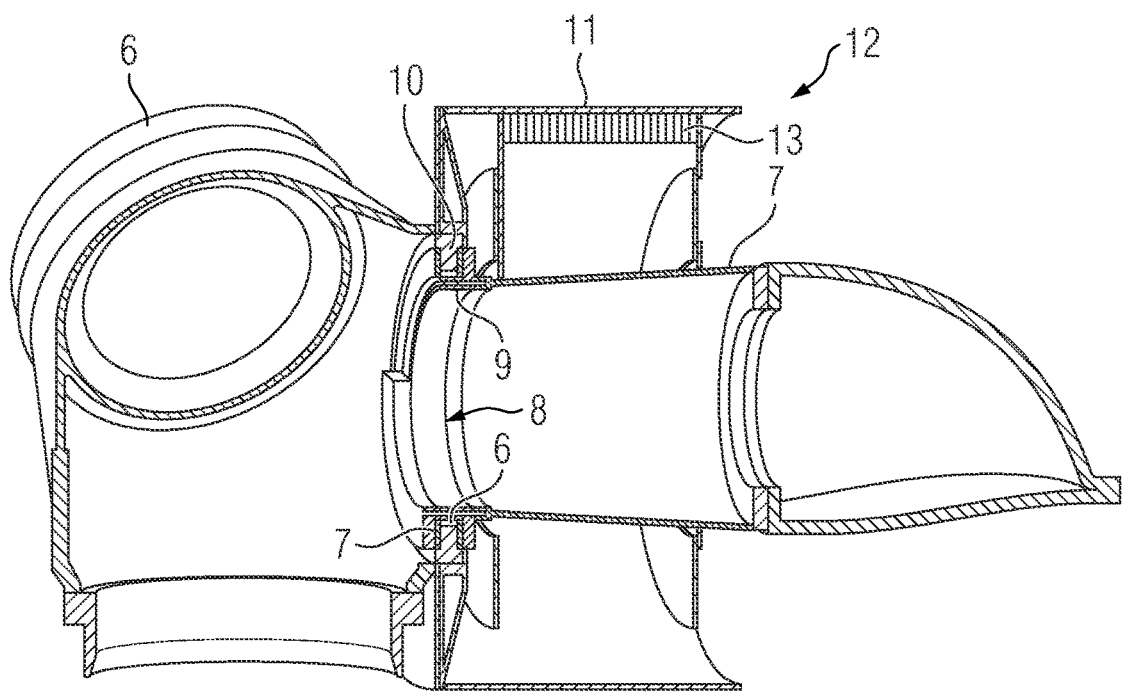
FIG. 2 shows a partial view in cross-section of the hub, the main shaft and the generator comprising a respective inventive bearing.

In the more detailed cross-section according to FIG. 2, the wind turbine 1 comprises a stationary main shaft 7, which is connected to a main bearing 8. This main bearing 8 comprises an inner or first ring 9, which is stationary and connected to the stationary main shaft 7. The bearing 8 further comprises a radially outer or second ring 10, which rotates relative to the stationary first ring 9 around the bearing axis of rotation. To this second ring 10 the hub 6 is connected so that a rotation of the hub 6 causes a rotation of the second ring 10. To this second ring 10 furthermore the rotor 11 of a generator 12 is connected, so that this rotor 11 is rotated when the hub 6 rotates. The generator 12 further comprises a stator 13, which is stationary connected to the stationary shaft 7. Also, this setup of a direct drive wind turbine 1 is commonly known.

Figure 3:
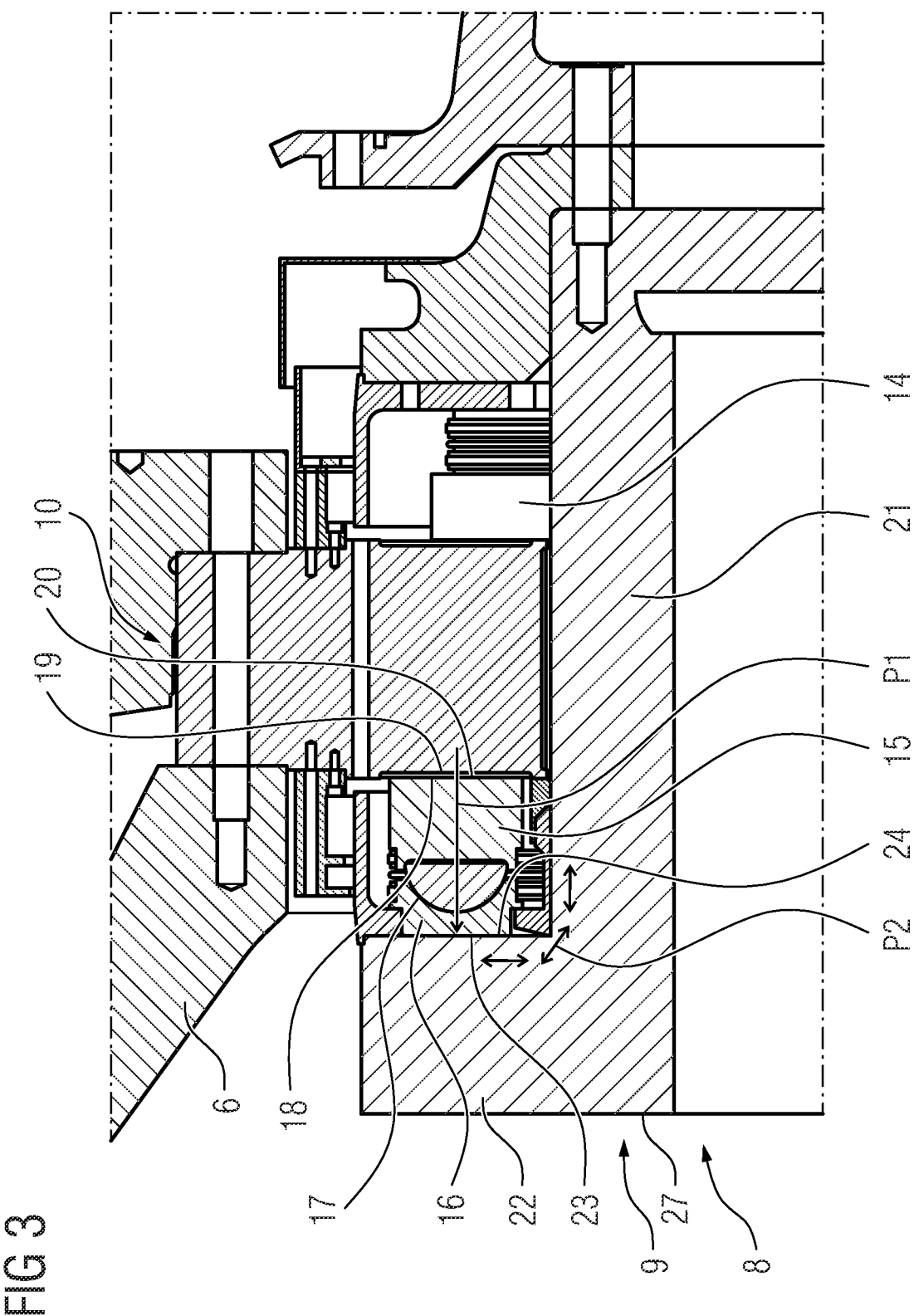
FIG. 3 shows a cross-section of an inventive bearing in an area, where no pretension element is provided, for illustrating the induced tensile stress.

The focus of embodiments of the invention lies on the setup of the bearing 8. FIG. 3 shows a cross-section of the bearing 8. It shows the inner first ring 9 and the outer second ring 10. The bearing 8 itself is a fluid film slide bearing in which the rotatable outer second ring 10 is radially and axially guided on the stationary inner second ring 9 by respective radial and axial bearing elements in form of sliding pads and a fluid film provided between the second ring 10 respectively its sliding surfaces and the respective sliding pads. In the cross-section according to FIG. 3, only the axial sliding pads 14 at the inner bearing side, which is orientated towards the main shaft 7 and the sliding pads 15 at the outer side of the bearing 8 are shown. The bearing elements in form of the sliding pads 15 are tiltable elements which, as shown at the sliding pad 15. A mounting base 16 is provided by which each sliding pad is mounted respectively supported at the first ring 9, to which mounting base 16 the sliding pad 15 guiding the respective ring is attached by a ball joint 17 allowing the sliding pad 15 to slightly tilt relative to the mounting base 16. As shown, the sliding pad 15 has a flat sliding surface 18 while the second ring 10 has a flat axial sliding surface 19 which slide on the sliding surface 18 by an intermediate fluid film 20. The same is true for the sliding pad 14.

As FIG. 3 shows, the first ring 9 has a specific L-shaped cross-section design. It comprises a cylindrical ring section 21, to which several radial slide bearing pads, which are not shown, are attached on which the second ring 10 is radially guided. Also here, a respective fluid film slide bearing contact is realized. From this cylindrical ring section 21, a collar 22 extends radially to the outside of the ring 9, as FIG. 3 shows. This collar, which is provided at the axial end of the ring 9, is provided with an axial support area 23, which is a flat ring support surface, at which the respective flat contact surface 24 of the mounting base 16 is supported respective to which it is fixed. So, obviously the cylindrical ring section 21 and the collar 22 form a L-shaped cross-section.

As shown by the arrow P1, the axial sliding pads 15 exert an axial force on the support area 23 and thus on the collar 22. This induces high tensile stress in the area where the collar 22 extends from the ring section 21, i.e., in the region where they both merge. The double arrows P2 are vectors showing the tensile stress in the material respectively the area of the first ring 9 where this high tensile stress is given. This high tensile stress is problematic with respect to the structural integrity of the first ring 9 respectively the whole fluid film bearing 8 in view of fatigue and extreme loads.

Figure 4:
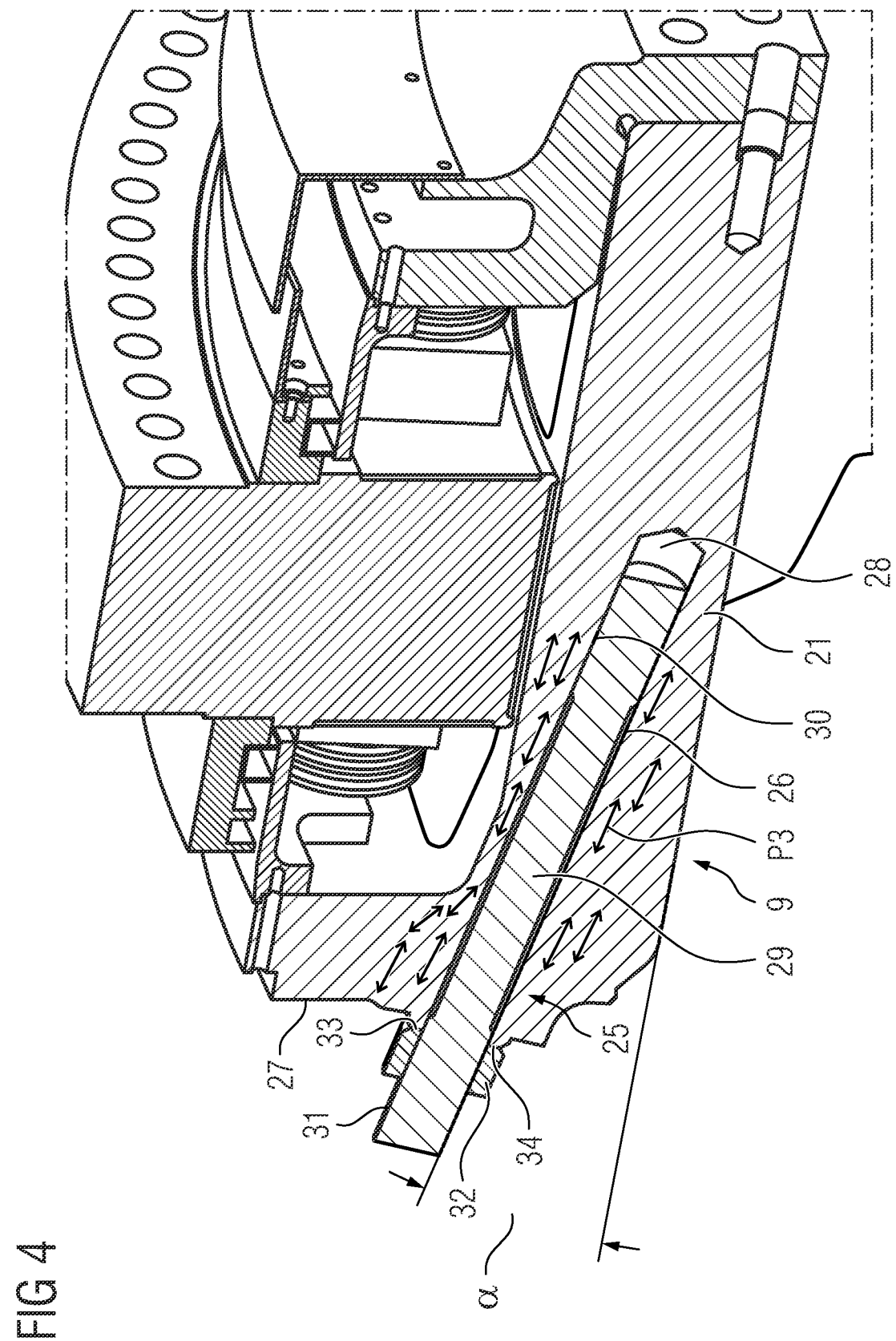
FIG. 4 shows a perspective cross-section of the inventive bearing in the area where the pretension element angled to the axis of rotation is provided.
Figure 5:
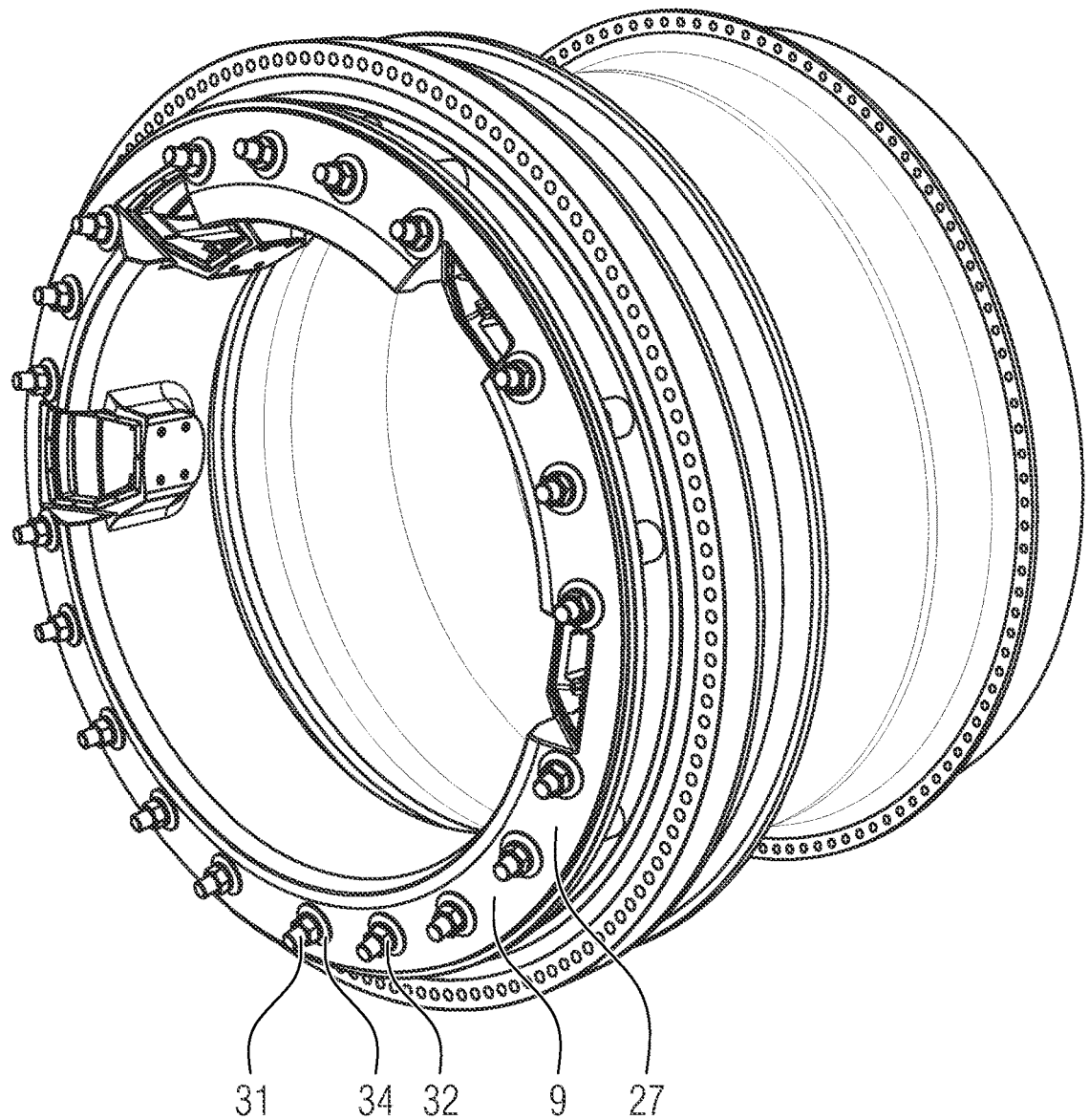
FIG. 5 shows a perspective view of an inventive bearing from the side where the pretension elements are arranged.

To counteract these high tensile stresses respectively its negative influence, several pretension elements 25 are fixed to the first ring 9. The first ring 9 is provided with several bores 26, which extend from the outer axial front surface 27 of the ring 9 respectively the ring section 21 into the ring section 21, as shown in FIG. 4. The bore 26 is provided with a thread 28 at least at its inner end or over its complete length. Into this threaded bore 26 a bolt 29 is screwed. The bolt 29 comprises at least a thread 30 at its inner end which is screwed into the thread 28 of the bore 26. The opposite end of the bolt 29 extends out of the bore 26 and is also provided with a thread 31. On this thread 31 a nut 32 is screwed, which nut 32 is supported with its flat contact surface 33 on a respective support surface 34. This flat support surface 34 is integrally provided at the ring 9 respectively at the axial front surface 27 as shown in FIG. 5.

As shown in FIG. 4, the longitudinal axis of the bore 26 and therefore also the longitudinal axis of the bolt 29 is angled relative to the axis of rotation of the bearing. The angle α is shown in FIG. 4. To ascertain that any load applied to the nut 32 for tensioning the bolt 29 is evenly distributed over its contact surface 33 to the support surface 34, also the support surface 34 is respectively angled. It is perpendicular to the longitudinal axis of the bore 26 respectively the bolt 29, corresponding to the respective angled arrangement of the bore 26 respectively the bolt 29. This allows for a very even load distribution.

When the respective threaded bolt 29 is screwed in the threaded bore 26 and has reached its final position, the nut 32 is screwed on the bolt 29 and tightened with a well-defined torque. As a bolt 29 is fixed in the bore 26, the first ring 9 is compressed resulting in a generation of a compression force which is mainly orientated along the bolt axis, as shown by the double arrows P3, showing respective vectors of the compression stress induced by the pretension element 25. This induced compressive stress counteracts or compensates the induced tensile stress respectively allows to take higher tensile stresses, so that in operation any tensile stress induced via the bearing elements 15 do not negatively influence the bearing respectively the ring material.

Figure 6:
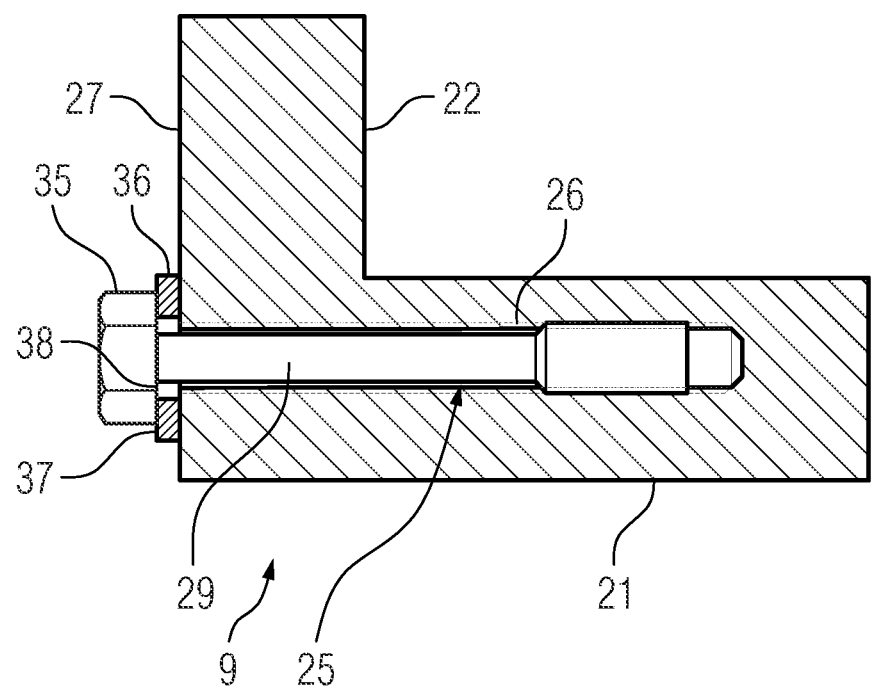
FIG. 6 shows a principle cross-section illustration with a pretension element arranged in parallel to the axis of rotation.

Finally, FIG. 6 shows another embodiment of the first ring 9 comprising the cylindrical ring section 21 and the collar 22. Again, not shown axial bearing elements 15 respectively sliding pads are axially supported on the collar 22 in the same manner as described to FIG. 3.

Also, in this embodiment the pretension elements 26 are provided at the first ring 9. The first ring 9 is provided with a respective number of threaded bores 26. Into each bore 26 a bolt 29 is screwed. The bolt 29 comprises an integral bolt head 35, here in form of a hex head, allowing a tool to be engaged at the bolt head 35. Between the bolt head 35 and the axial front surface 27 a washer 36 is arranged, which provides a respective support surface 37 on which the respective contact surface 38 of the bolt head 35 is supported. In this embodiment the longitudinal axis of the bore 26 and therefore of the bolt 29 is parallel to the axis of rotation.

As mentioned, a number of pretension elements 25 is provided around the circumference of the first ring 9 in an even respectively equidistant distribution, as shown in FIG. 5. The number of pretension elements 25 is selected depending on the expected tensile stress respectively loads which need to be compensated.

For producing the respective first ring 9 respectively for setting up the bearing 8, a specific chronological order of the respective steps is appropriate. After the respective bores 26 with their threads 28 are provided, the pretension elements 25 respectively the bolts 29 are inserted and either the nuts 32 are firmly tightened or the bolt 29 is firmly tightened via its bolt head 35, with a respective torque in order to provide the necessary requested compression stress within the material. As this induced compressive stress causes a certain while very little deformation in the region of the collar 22 and of the support area 23, this support area 23 finally machined, when all bolts 29 are fixed. Any deformations resulting in the fixation of the bolts 29 are removed and the final support area 23 it as flat as possible for providing an ideal surface to support the respective bearing element 15 respectively its mounting base 17. This ascertains a proper load sharing between the bearing elements 15 around the whole circumference of the ring 9.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A bearing for a wind turbine, comprising a first and a second ring arranged radially to each other with one ring rotating relative to the other ring around an axis of rotation, whereby the first ring has a cylindrical ring section and a collar extending radially from the ring section, whereby the collar has an axial support area supporting axial bearing elements, wherein several pretension elements creating compressive stress are fixed to the first ring in the section where the collar extends from the ring section.

2. The bearing according to claim 1, wherein each pretension element is a at least partially threaded bolt inserted in a at least partially threaded bore extending into the ring section, wherein the bolt is directly or indirectly supported on a support surface against the ring.

3. The bearing according to claim 2, wherein each bore is provided in an axial surface of the first ring and extends into the ring section.

4. The bearing according to claim 3, wherein each bores and each bolts are equidistantly distributed around the axis of rotation.

5. The bearing according to claim 2, wherein each bore extends parallel to the axis of rotation, or that each bore extends at an angle to the axis of rotation into the ring section.

6. The bearing according to claim 5, wherein the angle is between 3° and 30°.

7. The bearing according to claim 2, wherein each bolt extends with a threaded end out of the bore, wherein a nut is screwed on the thread , wherein the nut is supported on the support surface.

8. The bearing according to claim 7, wherein the nut or the bolt head of each bolt arranged angled towards the axis of rotation is supported on a support surface which is orientated perpendicular to the longitudinal bore axis.

9. The bearing according to claim 8, wherein the support surface is integral with the first ring, or that a washer comprising the support surface is provided.

10. The bearing according to claim 2, wherein each bolt has a bolt head comprising an attachment section for a tool, wherein the bolt head is supported on the support surface.

11. The bearing according to claim 1, wherein the bearing elements are tiltable fluid film bearing pads.

12. A wind turbine, comprising at least one bearing according to claim 1.

13. The wind turbine according to claim 12, wherein the bearing is the main bearing of the wind turbine.

14. The wind turbine according to claim 12, wherein the first ring is an inner ring and is coupled to a stationary main shaft, while the second ring is an outer ring and is coupled to a rotor of a generator.

15. A method for producing a first ring of a bearing according to claim 1, wherein the pretension elements are first fixed to the ring and tensioned for generating the compression stress, whereafter the support area of the collar is machined.

* * * * *